United States Patent
Sakai

(10) Patent No.: US 7,467,076 B2
(45) Date of Patent: Dec. 16, 2008

(54) APPARATUS FOR PREDICTING RELIABILITY IN ELECTRONIC DEVICE PACKAGE, PROGRAM FOR PREDICTING RELIABILITY IN ELECTRONIC DEVICE PACKAGE, AND METHOD FOR PREDICTING RELIABILITY IN ELECTRONIC DEVICE PACKAGE

(75) Inventor: Hidehisa Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/509,615

(22) Filed: Aug. 25, 2006

(65) Prior Publication Data

US 2006/0294436 A1 Dec. 28, 2006

Related U.S. Application Data

(63) Continuation of application No. PCT/JP2005/001782, filed on Feb. 7, 2005.

(30) Foreign Application Priority Data

Mar. 10, 2004 (JP) ............................. 2004-067116

(51) Int. Cl.
*G06F 17/50* (2006.01)
*G06G 7/62* (2006.01)

(52) U.S. Cl. ..................................................... 703/13

(58) Field of Classification Search .................... 703/13
See application file for complete search history.

(56) References Cited

U.S. PATENT DOCUMENTS 6,132,108 A 10/2000 Kashiwamura et al.

7,171,897 B2 * 2/2007 Barajas et al. ............... 101/129

FOREIGN PATENT DOCUMENTS

| JP | 10-207926 | 8/1998 |
|----|-----------|--------|
| JP | 2000-99550 | 4/2000 |
| JP | 2000-304630 | 11/2000 |

OTHER PUBLICATIONS

Yuan and Chiang, Micro to Macro Thermo-Mechanical Simulation of Wafer Level Packaging, Dec. 2003, Journal of Electronic Packaging, vol. 125, Issue 4, pp. 576-581.*
Sakai et al., Shape Prediction And Residual Stress Evaluation Of Bga And Flipchip Solder Joints, May 2000, Thermal and Thermomechanical Phenomena in Electronic Systems, ITHERM 2000, Seventh Intersociety Conference, vol. 2, pp. 181-186.*
International Search Report dated Mar. 22, 2005 in corresponding PCT Patent Application No. PCT/JP2005/001782.

* cited by examiner

*Primary Examiner*—Zoila E Cabrera
*Assistant Examiner*—Juan C Ochoa
(74) *Attorney, Agent, or Firm*—Staas & Halsey LLP

(57) ABSTRACT

Reliability of an electronic package is predicted based on material type, shape and dimensions of the package and conditions for assessment thereof, and a modeling unit creates a simulation model based thereon. An executing unit uses the simulation model to execute a simulation under designated conditions and results of the simulation are stored in a database. The stored simulation is assessed according to the assessment criteria and the assessment results are stored in a database. A generating unit generates, as an assessment expression, an approximate expression which infers the results of assessment from the inputted parameters, on the assumption that a predetermined amount of results of assessment is preserved. An assessment predicting unit outputs the results of an assessment of a package in which an assessment expression has already been established, by using the assessment expression.

6 Claims, 11 Drawing Sheets

Fig.5

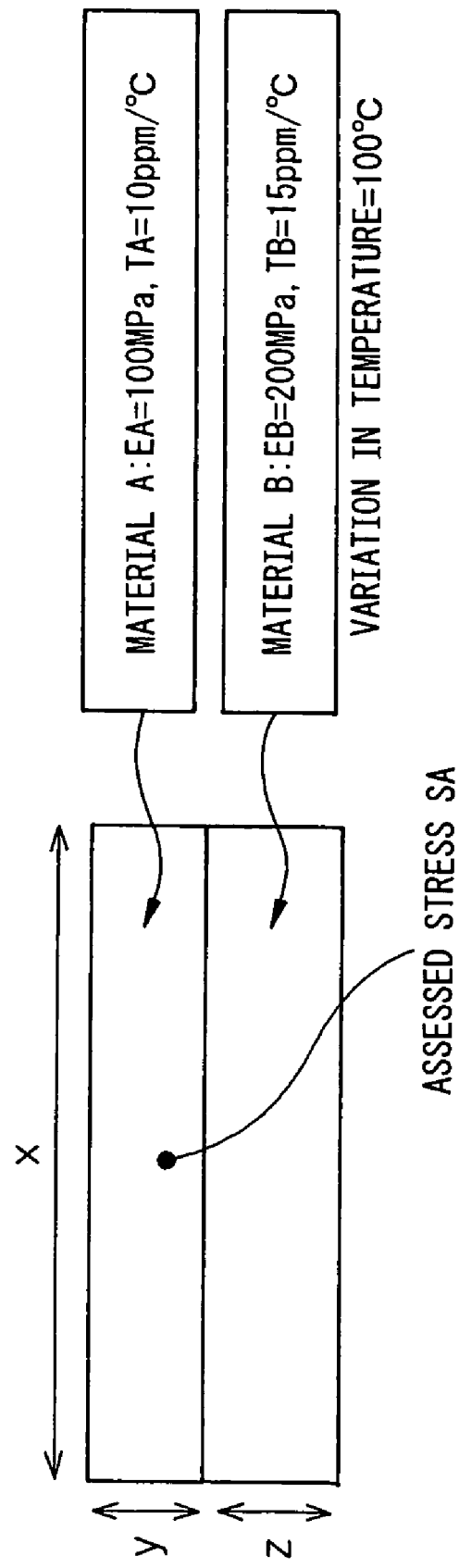

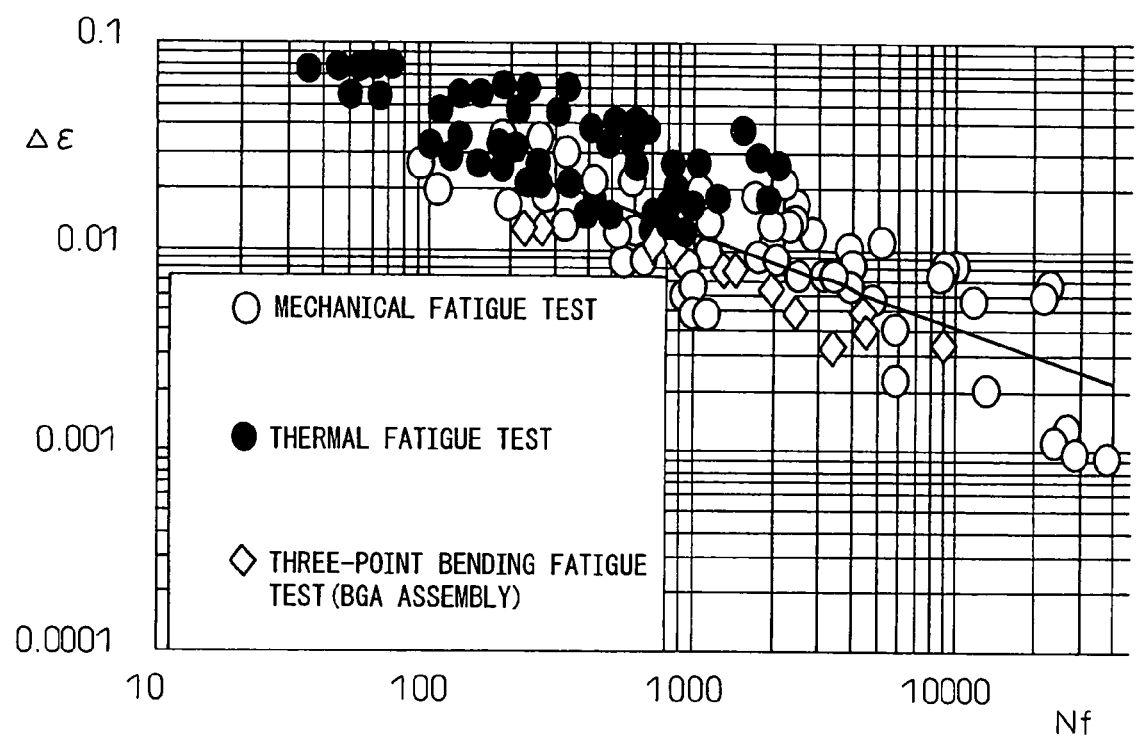

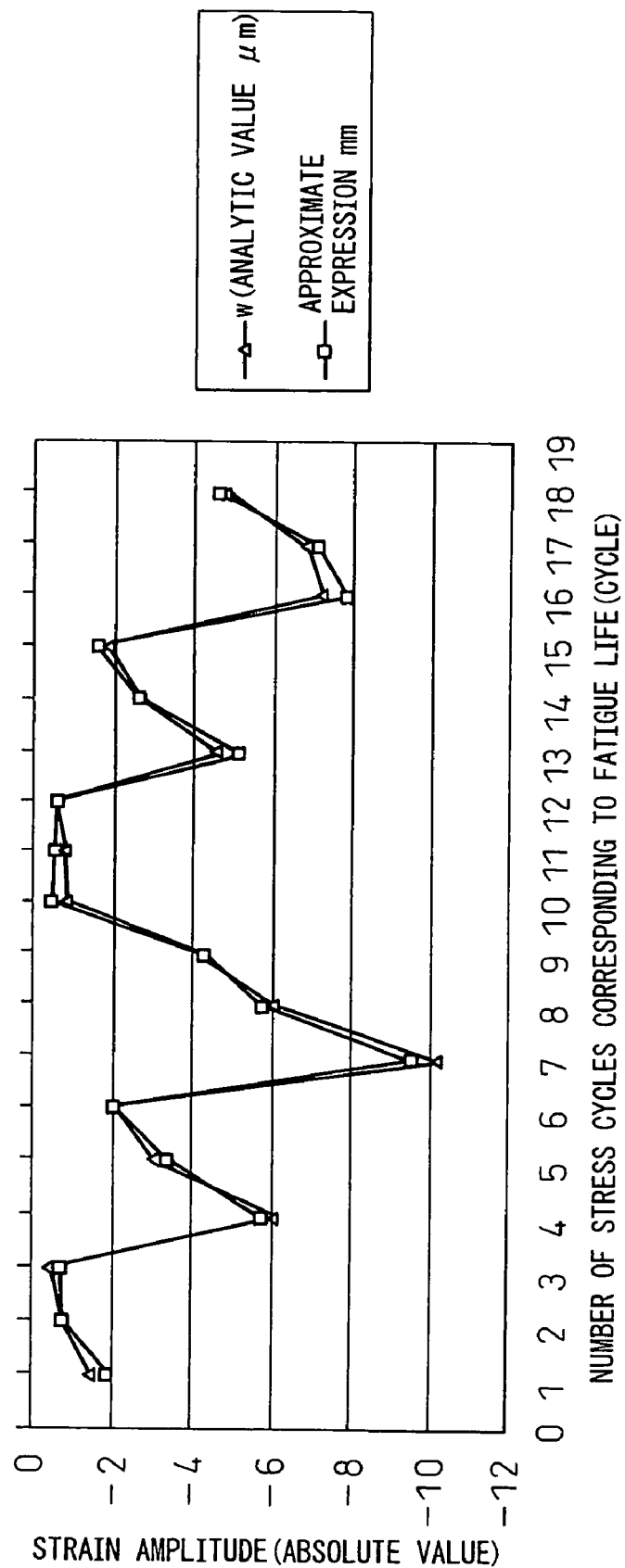

APPARATUS FOR PREDICTING RELIABILITY IN ELECTRONIC DEVICE PACKAGE, PROGRAM FOR PREDICTING RELIABILITY IN ELECTRONIC DEVICE PACKAGE, AND METHOD FOR PREDICTING RELIABILITY IN ELECTRONIC DEVICE PACKAGE

CROSS-REFERENCE TO RELATED APPLICATION

This is a Continuation of Application No. PCT/JP2005/001782 filed on Feb. 7, 2005. The entire disclosure of the prior application is hereby incorporated herein by reference.

BACKGROUND OF THE INVENTION

1. Field of the Invention

The present invention relates to an apparatus for predicting reliability in an electronic device package, a program for predicting reliability in an electronic device package, and a method for predicting reliability in an electronic device package, at the stage of designing the electronic device package.

2. Description of the Related Art

In electronic equipment represented by a personal computer, a portable cellular phone, and the like, various electronic components have become more and more integrated and have a high density. In connection with this, the pitch of terminals disposed in an electronic device package, including these electronic components and incorporated in the electronic equipment, (i.e., a distance between adjoining terminals) has become smaller. As these electronic components mounted in an electronic device package are more and more integrated with high density (i.e., the electronic device package is designed to be very compact), reliability in the mounted electronic components and, more particularly, reliability at a solder joint, has become very important. In order to mount numerous electronic components in the electronic device package with high density, a ball grid array (BGA) package (that is, a kind of surface mounting package in which spherical solder-balls are arranged in the form of array on the rear surface of a printed-circuit board, without using lead terminals) or a chip size package (CSP) (that is, an large-scale integrated (LSI) package having substantially the same dimensions as a chip) has become widely adopted. A solder joint included in the electronic device package, the BGA package, the CSP, or the like, for an electronic device is normally called as a "micro-joint." The solder joint in the above electronic device package is subjected to stresses including a variation in temperature, an impact caused by a drop, and the like. When an attempt is made to apply the solder joint to an actual product, reliability in the strength of the entire electronic device package including the solder joint must be assessed satisfactorily.

One typical method for assessing the strength of a micro-joint in an electronic device package includes an assessment method that utilizes a computer aided engineering (CAE) (more specifically, a numerical analysis and a simulation that is to be carried out by a computer in the course of designing or developing an industrial product) system on the basis of a simulation technology, such as an analysis by a finite element method (FEM simulation). In designing or developing a new electronic device package, it has now become a conventional technique to use a CAE system for assessing the above strength. However, the structure of the electronic device package is so complex that it takes much time to create a simulation model or carry out the calculations required for a simulation. Furthermore, for example, when a simulation model for a solder joint is to be created, the material that is to be used for forming the solder joint is liable to be non-linearly deformed, owing to creep deformation, etc. Therefore, it is difficult to obtain appropriate data concerning material properties. Furthermore, the setting for the simulation is complex, and therefore, it is necessary to have specialized knowledge about various program codes, including a specific program code for carrying out the finite element method. Because of the above-mentioned problems, it is difficult for an ordinary designer, a factory worker, or a responsible person who needs most earnestly information about the strength of the solder joint, to make an assessment by directly carrying out the simulation.

Further, the assessment of the results of simulation also causes the following problem. When the simulation is carried out in order to assess a solder joint or the like, as the place in which a maximum stress or a maximum strain occurs is the end portion of a joint interface between solder and any material other than solder, the end portion of the joint interface is regarded as a stress singularity place. Depending on the method for creating a simulation model, the value of the maximum stress or maximum strain varies greatly. In other words, specialized knowledges about both a modeling method for creating the simulation model and the assessment of the results of simulation obtained actually by carrying out the simulation are needed.

On the other hand, when a simulation is carried out in order to assess the strength of an entire electronic device package, namely, when the simulation is carried out in order to simultaneously assess both a microscopic joint such as a micro-joint and the entire electronic device package, the size of a simulation model is relatively large. It therefore takes much time to carry out simulation-related calculations. In particular, there are some kinds of simulations in which several days may be required in order to obtain the required results of simulation. This hinders the rapid and accurate assessment and causes the delay in design changes.

For example, as described in Japanese Unexamined Patent Publication (Kokai) No. 2000-304630 (hereinafter referred to as Patent Document No. 1) and Japanese Unexamined Patent Publication (Kokai) No. 2000-99550 (hereinafter referred to as Patent Document No. 2), various techniques have been devised as the related art in efforts to speed up a simulation that to be carried out in order to assess the strength, etc., of an entire electronic device package.

Patent Document No. 1 discloses a method, for analyzing a mounted semiconductor device package, in which a structure model having a BGA package or a CSP mounted on a printed-circuit board is used to rapidly and highly accurately analyze a simulation that is carried out in order to assess a thermal strain generated in a solder joint and the prediction of a service life of the solder joint. In the method for analyzing the semiconductor device package mounted structure, a two-dimensional planar model is normally used to carry out the simulation. Thus, the service life of the solder joint in an electronic device package can be predicted. A technology for predicting the service life by means of an analysis by using a normal two-dimensional planar model is already widely known. In Patent Document No. 1, a parameter representing a thickness direction and being designated an analysis for the two-dimensional planar model is adjusted to be consistent with an actual phenomenon.

Patent Document No. 2 discloses a method for analyzing an IC package. In this method, when a service life of an electronic device package is predicted by means of a three-dimensional analysis, a coarse model is used to schematically analyze an analytic model for the three-dimensional analysis, in advance of highly accurately and efficiently carrying out three-dimensional analysis. A region of interest is determined by schematically analyzing the analytic model, and subsequently, a detailed model is created. Consequently, highly accurate analysis of the IC package can be carried out by analyzing the detailed model.

However, when a CAE system based on a simulation technology such as an analysis by a finite element method or the like is used to generally assess an electronic device package according to a conventional method described in Patent Document No. 1 or No. 2, the following problems occur. It is difficult to obtain data concerning material properties (i.e., material property values), it is difficult to create an analytic model because of the complex structure of the electronic device package, and it takes much time to carry out a simulation. Further, it is almost impossible for a person having no specialized knowledge to make assessment directly by carrying out the simulation.

SUMMARY OF THE INVENTION

An object of the present invention is to provide an apparatus for predicting reliability in an electronic device package, a program for predicting reliability in an electronic device package, and a method for predicting reliability in an electronic device package, which allow an ordinary designer or a factory worker to easily assess the strength of an electronic device package, without carrying out a simulation, by utilizing the results of analysis carried out by an expert having a specialized knowledge, and to appropriately predict the reliability in the electronic device package.

In order to attain the above object, the present invention provides an apparatus for predicting reliability in an electronic device package including constituent components (e.g., the databases and the units) described below.

In other words, the present invention provides the apparatus for predicting reliability in an electronic device package, including:

a package modeling database that stores data concerning the shape of an electronic device package and the specifications for modeling the electronic device package;

a material property database that stores data concerning the properties (material properties) of a material made into the electronic device package;

a parameter designating unit for receiving parameters inputted to designate a type of the electronic device package, dimensions thereof, selected material thereof, and conditions for assessment thereof;

a modeling unit for creating a simulation model on the basis of parameters of the material properties, and the dimensions of the electronic device package, which are designated by using the inputted parameters;

a simulation executing unit for using the simulation model which is created by the modeling means, to execute a simulation under the conditions designated by the inputted parameters;

a results-of-simulation assessing unit for assessing the results of a simulation carried out by the simulation executing unit on the basis of a predetermined assessment criterion, and storing and preserving, in a results-of-assessment database, the inputted parameters and results of assessment which are obtained by assessing the results of a simulation, with regard to each type of the electronic device package;

an assessment expression generating unit for generating, as an assessment expression, an approximate expression, which infers the results of assessment from the inputted parameters, on the assumption that a predetermined amount of the results of assessment is preserved in the results-of-assessment database; and an assessment predicting unit for, when an electronic device package in which the assessment expression has already been established is designated by using the inputted parameters, outputting the results of an assessment prediction according to the assessment expression.

Preferably, in the apparatus for predicting the reliability in the electronic device package according to the present invention, the assessment expression generating unit has the function of updating the assessment expression every time the results of a simulation are obtained by carrying out the simulation.

More preferably, the apparatus for predicting the reliability in the electronic device package according to the present invention uses an orthogonal polynomial expression, which is based on the design of experiments method, to generate an initial assessment expression in establishing the assessment expression, and updates the assessment expression on the basis of the least squares method.

Moreover, the present invention provides a program for predicting reliability in an electronic device package by allowing a computer, which includes a package modeling database that stores data concerning the shape of an electronic device package and the specifications for modeling the electronic device package, and a material database that stores data concerning the properties of a material made into the electronic device package, to function as:

a parameter designating unit for receiving parameters inputted to designate a type of the electronic device package, dimensions thereof, selected material thereof, and conditions for assessment thereof;

a modeling unit for creating a simulation model on the basis of parameters of the properties of the material, and the dimensions of the electronic device package, which are designated by using the inputted parameters;

a simulation executing unit for using the simulation model which is created by the modeling unit, to execute a simulation under the conditions designated by the inputted parameters;

a results-of-simulation assessing unit for assessing the results of a simulation carried out by the simulation executing unit on the basis of a predetermined assessment criterion, and storing and preserving, in a results-of-assessment database, the inputted parameters and results of assessment which are obtained by assessing the results of a simulation, with regard to each type of the electronic device package;

an assessment expression generating unit for generating, as an assessment expression, an approximate expression, which infers the results of assessment from the inputted parameters, on the assumption that a predetermined amount of the results of assessment is preserved in the results-of-assessment database; and an assessment predicting unit for, when an electronic device package in which an assessment expression has already been established is designated by using the inputted parameters, outputting the results of an assessment prediction according to the assessment expression.

Moreover, the present invention provides a method for predicting reliability in an electronic device package by using a computer, which includes a package modeling database that stores data concerning the shape of an electronic device package and the specifications for modeling the electronic device package, and a material property database that stores data concerning the properties of a material made into the electronic device package, comprising:

receiving parameters inputted to designate a type of the electronic device package, dimensions thereof, selected material thereof, and conditions for assessment thereof;

creating a simulation model on the basis of parameters of the material properties, and the dimensions of the electronic device package, which are designated by using the inputted parameters;

using the created simulation model, to execute a simulation under the conditions designated by the inputted parameters;

assessing the results of a simulation carried out by executing the simulation on the basis of a predetermined assessment criterion, and storing and preserving, in a results-of-assessment database, the inputted parameters and results of assessment which are obtained by assessing the results of a simulation, with regard to each type of the electronic device package;

generating, as an assessment expression, an approximate expression, which infers the results of assessment from the inputted parameters, on the assumption that a predetermined amount of the results of assessment is preserved in the results-of-assessment database; and outputting the results of an assessment prediction according to the assessment expression, when an electronic device package in which the assessment expression has already been established is designated by using the inputted parameters.

In short, the parameter designating unit, modeling unit, simulation executing unit, results-of-simulation assessing unit, assessment expression generating unit, and assessment predicting unit that constitute the apparatus for predicting a reliability in an electronic device package in accordance with the present invention as described above are implemented by the program stored in advance in a memory included in a computer, such as a random-access memory (RAM) or a read-only memory (ROM). More particularly, the parameter designating unit, modeling unit, simulation executing unit, results-of-simulation assessing unit, assessment expression generating unit, and assessment predicting unit are implemented by reading out the program, which is stored in advance in the memory included in the computer, by means of a central processing unit (CPU) and by making the program run.

According to the present invention, the advantages described below are provided.

(1) As the results of simulation are assessed, certain stable results of assessment can be obtained.

(2) A user need not have any special knowledge of material properties or a simulation and can assess an electronic device package merely by using knowledge of the structure of the electronic device package.

(3) With regard to an electronic device package in which an assessment expression has already been established, results of assessment with a certain accuracy can be obtained for a very short period of time without the necessity of executing a simulation.

BRIEF DESCRIPTION OF THE DRAWINGS

The above object and features of the present invention will be more apparent from the following description of some preferred embodiments with reference to the accompanying drawings, wherein:

FIG. 5 shows the second example (part 1) of the input screen image in which parameters are interactively inputted;

FIG. 9 illustratively shows an example of parameters which are to be inputted in order to generate an approximate assessment expression;

FIG. 10 is a graph indicating an example of results of assessment obtained by carrying out a fatigue test on a solder joint; and FIG. 11 is a graph indicating the relationship between a fatigue life represented by the number of stress cycles and a strain amplitude.

DESCRIPTION OF THE PREFERRED EMBODIMENTS

Referring to the appended drawings (FIG. 1 to FIG. 11), some preferred embodiments related to an apparatus for predicting a reliability in an electronic device package in accordance with the present invention will be described below.

Figure 1:
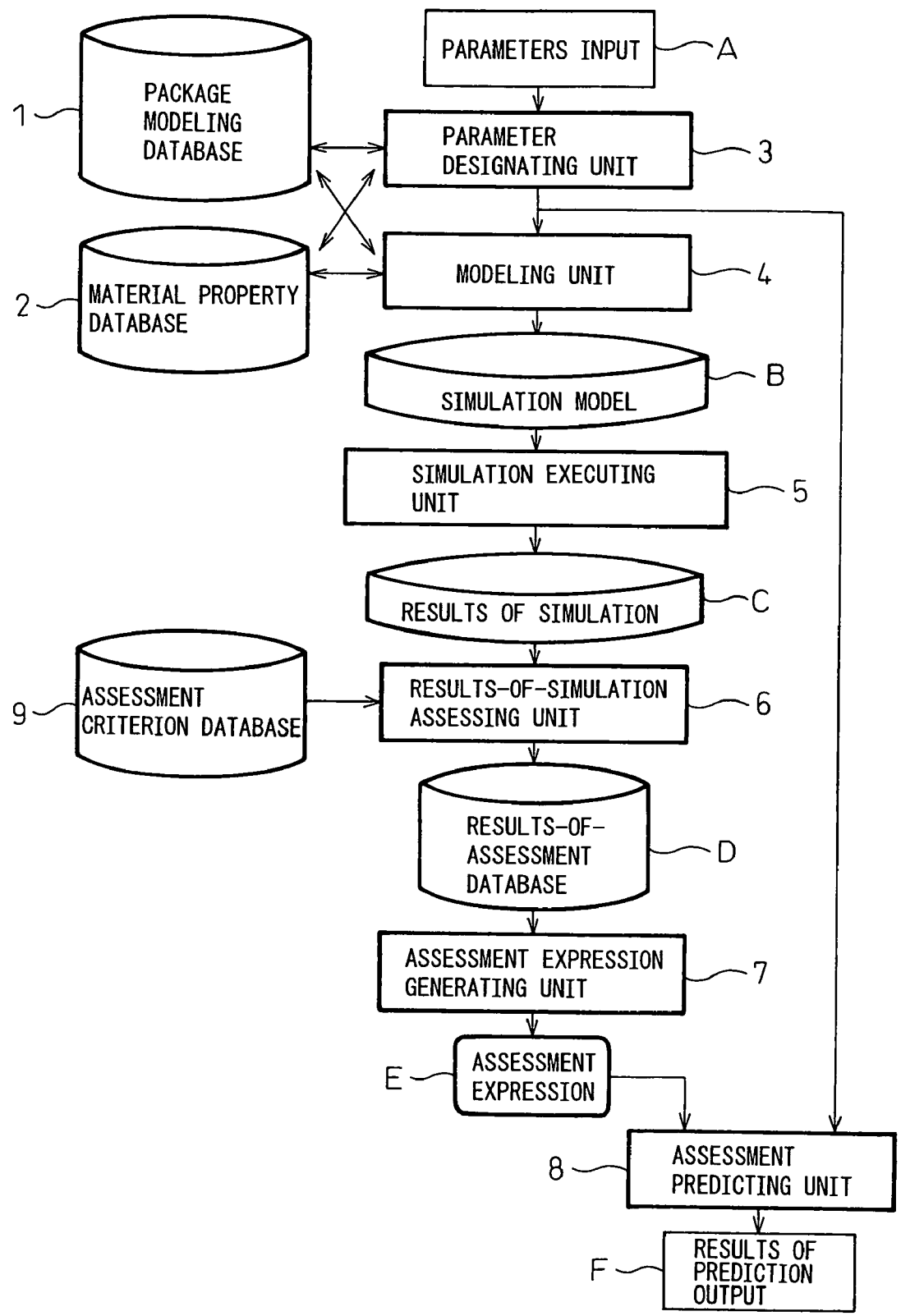
FIG. 1 is a block diagram showing the basic configuration of the present invention.
Figure 2:
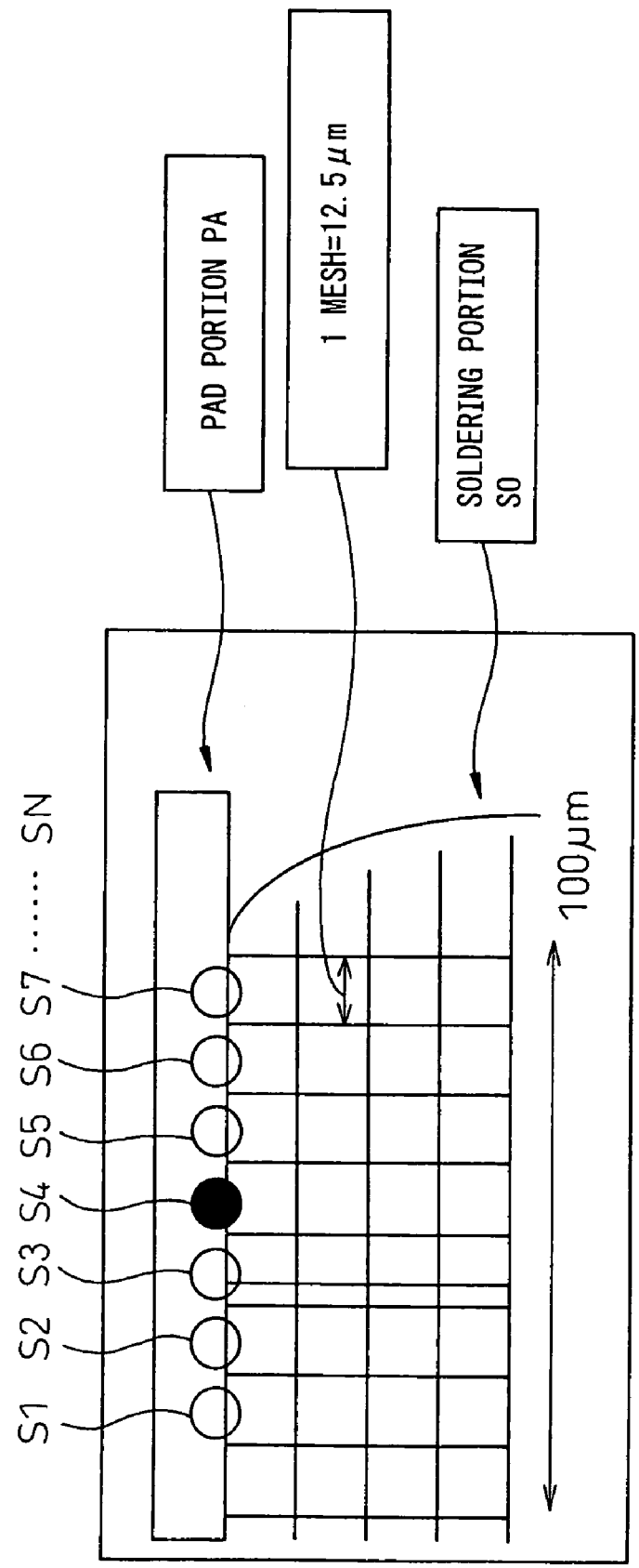
FIG. 2 is a conceptual diagram showing an example in which a solder joint is split into standard meshes that are to be used in order to assess the solder joint according to the finite element method.

FIG. 1 is a block diagram showing the basic configuration of the present invention, and FIG. 2 is a conceptual diagram showing an example in which a solder joint is split into standard meshes that are be used in order to assess the solder joint according to the finite element method. Herein, the configuration of the apparatus for predicting a reliability in an electronic device package in accordance with the present invention is shown simplified.

The apparatus for predicting a reliability in an electronic device package shown in FIG. 1 is provided with a package modeling database 1 that stores data concerning the shape of a package for an electronic device and the specifications for modeling the electronic device package, and a material property database 2 that stores data concerning the properties (material properties) of a material made into the electronic device package.

Herein, the electronic device package that is an object of assessment is limited to several typical types of packages. Data items concerning the several types of packages are stored in the package modeling database 1.

The types of electronic device packages include, for example, a flip-chip BGA (FC-BGA) package, an over molded pad array carrier (OMPAC) package, a fine pitch BGA (FBGA) package, an enhanced BGA (EBGA) package, a tape-automated bonding BGA (TabBGA) package, and a flip-chip-C4 package.

A person in charge of simulation classifies modeling methods by which various types of electronic device packages are modeled, and standardizes in advance a modeling technology that significantly affects the assessment of the results of simulation. For example, according to the finite element method that is a typical technique of simulation, the entire region of a simulation model is split into sub-regions which are usually called meshes. The results of simulation are affected by the size of each of the sub-regions into which the model is split, that is, a mesh size. Consequently, the mesh size that is a significant point in assessing a reliability should be standardized in advance.

For example, FIG. 2 shows the mesh size of standard meshes employed in assessing a solder joint, which is included in an electronic device package, according to the finite element method. In the example shown in FIG. 2, solder joint portions S1, etc., S4, etc., S7, etc., and SN collectively constituting the solder joint between a pad portion PA and a soldering portion SO (where N denotes any positive integer and blank and filled circles denote respective positions of the solder joint portions falling within respective standard meshes) extends over an area of about 100 μm long and is split into a plurality of standard meshes each having a mesh size of 12.5 μm. Parameters concerning the dimensions representing characteristics of constituent components which are necessary to determine the shape of the electronic device package that is an object of assessment, and effective ranges within which values of the parameters can be available, are determined in advance. If a value of the parameter falling outside the effective ranges is designated, a system displays an alarm message so as to prevent the value falling outside the effective range from being inputted erroneously.

Referring now back to FIG. 1, data concerning material properties (material property values) including a modulus of elasticity (Young's modulus) of a material which is to be made into an electronic device package and a coefficient of linear expansion, which are necessary for a simulation to be carried out in order to assess the reliability, are specified in relation to each of the defined materials and then preserved in advance in the material property database 2.

In the apparatus for predicting the reliability in the electronic device package shown in FIG. 1, a parameter designating unit 3 receives parameters (A) inputted to designate a type of electronic device package, dimensions thereof, a selected material thereof, and conditions for assessment thereof, and fetches necessary data from the package modeling database 1 and material property database 2 alike, and transfers the data to a modeling unit 4. The parameter designating unit 3 is implemented by making a predetermined program residing in a computer system run. With regard to the parameters, a user can interactively input them via an input screen image, e.g., a given one of the input screen images shown in FIG. 3 to FIG. 6. In this case, the parameters are readily and assuredly inputted.

Figure 3:
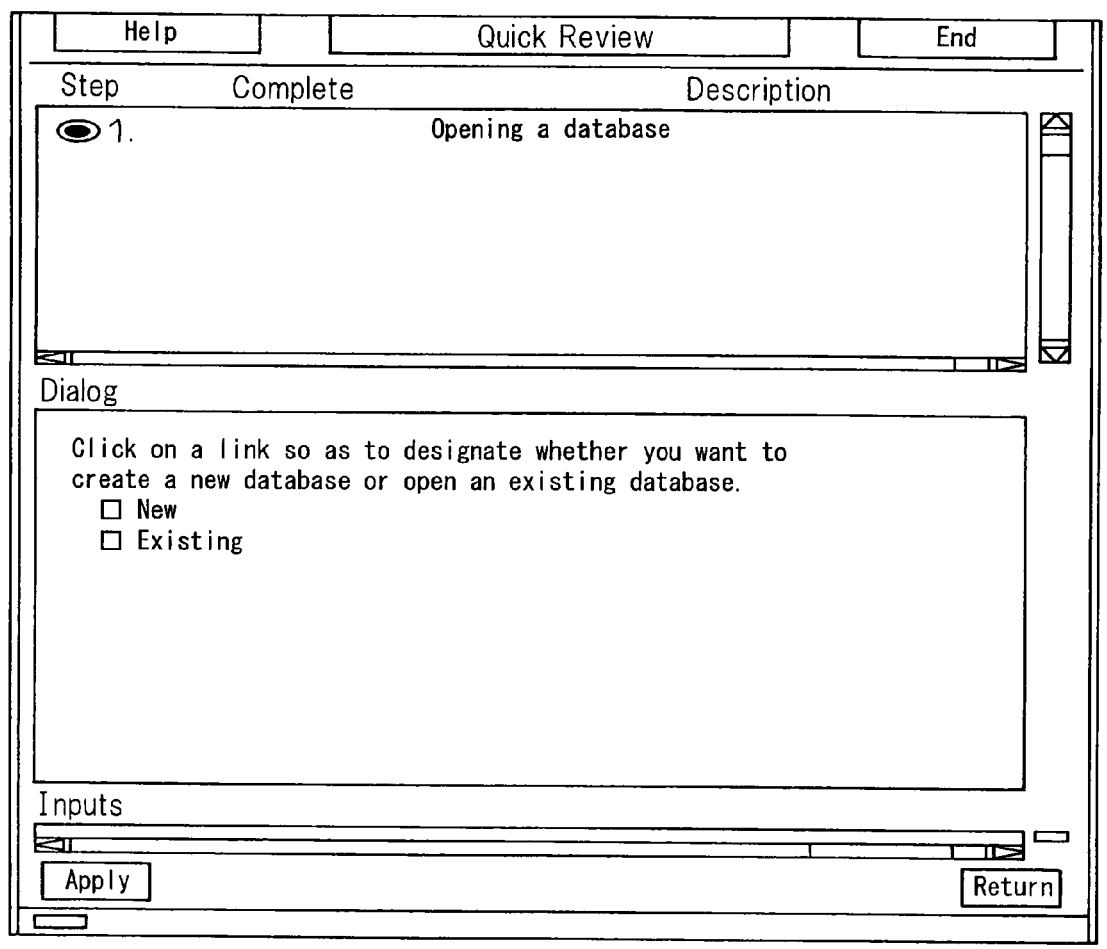
FIG. 3 shows the first example (part 1) of an input screen image in which parameters are interactively inputted.
Figure 4:
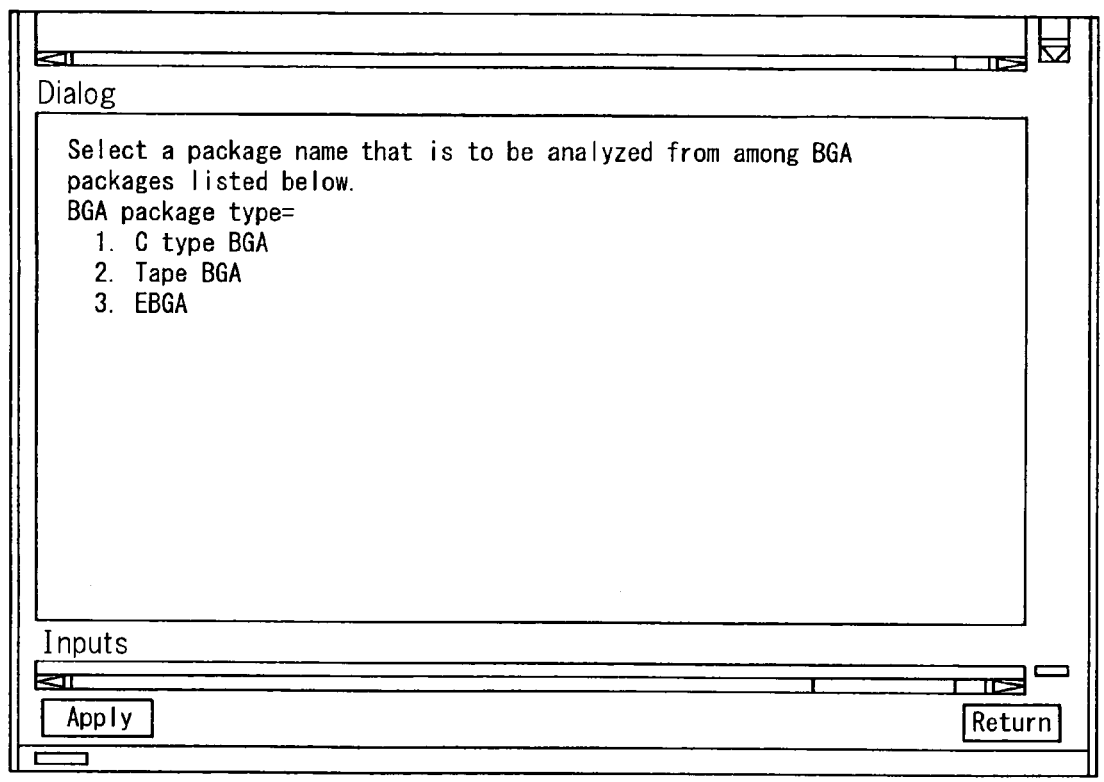
FIG. 4 shows the first example (part 2) of the input screen image in which parameters are interactively inputted.
Figure 5:
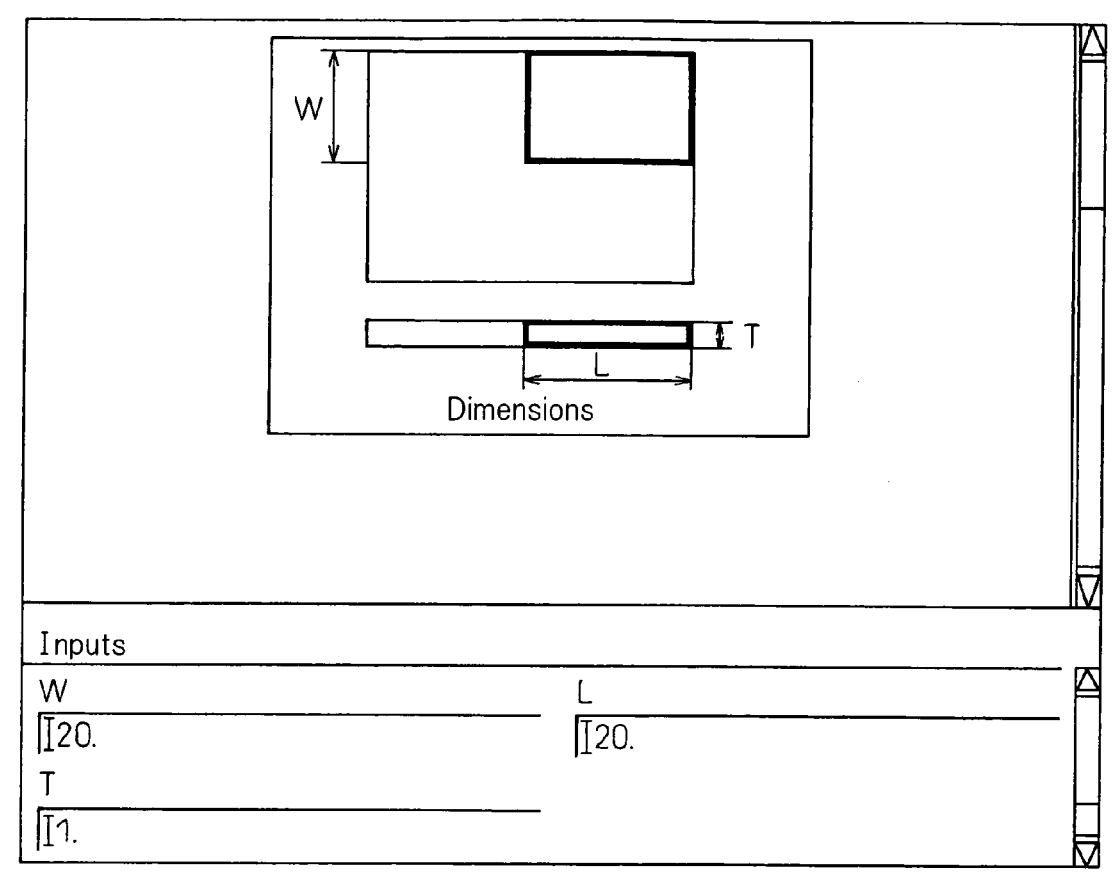
Figure 6:
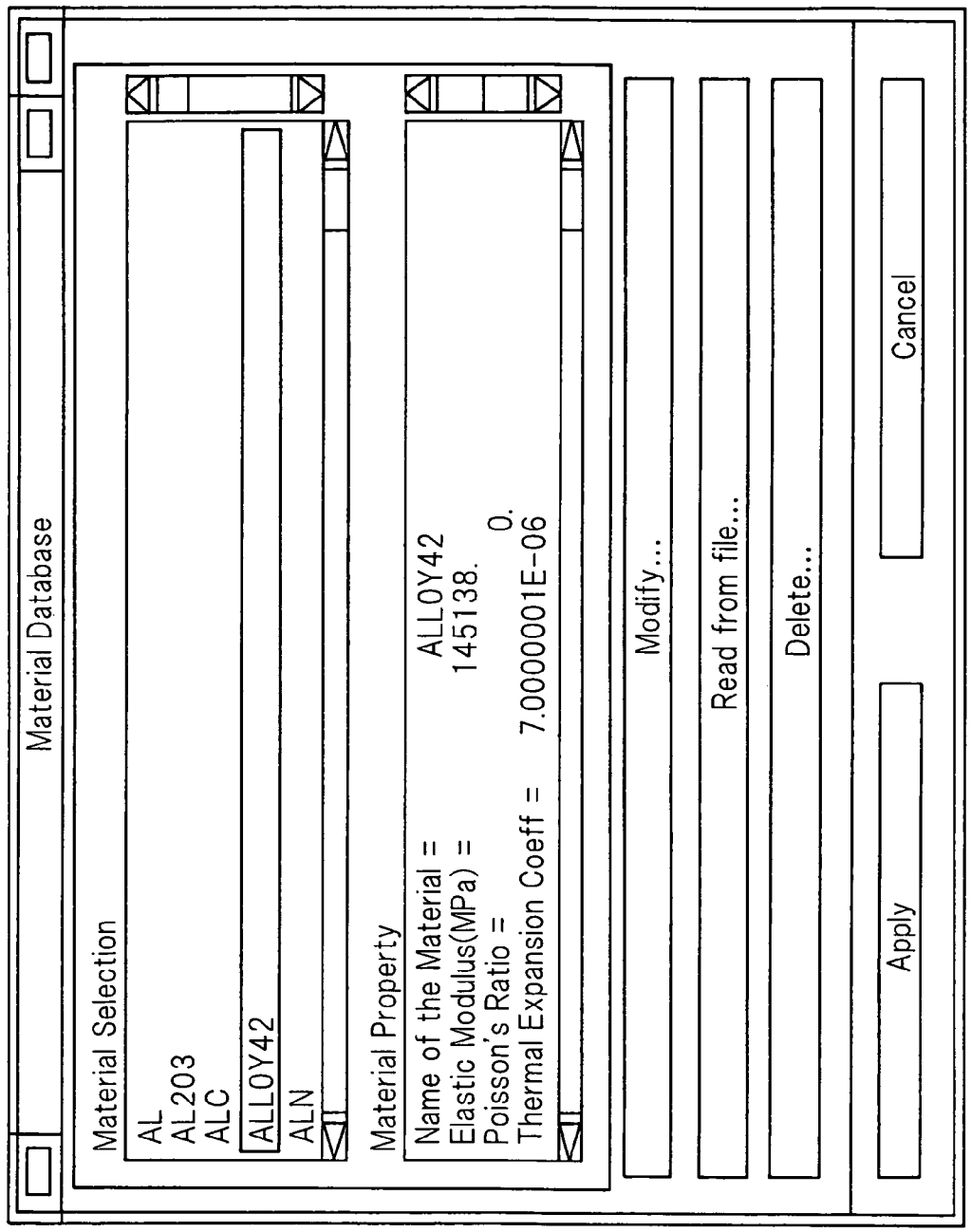
FIG. 6 shows the second example (part 2) of the input screen image in which parameters are interactively inputted.

FIG. 3 and FIG. 4 show input screen images that are part 1 and part 2 of the first example of an entry screen image in which parameters are interactively inputted. FIG. 5 and FIG. 6 show input screen images that are part 1 and part 2 of the second example of the input screen image in which parameters are interactively inputted.

The input screen image shown in FIG. 3 is an example of an initiation screen image. A user clicks a link displayed as "New" or "Existing" so as to designate whether the user wants to create a new database or open an existing database. The input screen image shown in FIG. 4 is a screen image in which the user designates a type of package that is to be analyzed from among the displayed electronic device packages after opening the existing database. In the example shown in FIG. 4, the user designates C type BGA, Tape BGA, or EBGA from among all the BGA package types.

The input screen image shown in FIG. 5 is an example of a sequential and interactive input screen image in which parameters concerning the dimensions representing characteristics of constituent components of the electronic device package and conditions for a load are inputted. A user sequentially and interactively inputs the typical dimensions (width W, length L, and thickness T) of the designated package that is to be assessed in relation to each load while referring to a sample displayed on the same screen image. The conditions of a load including a temperature and a load are also interactively defined.

Similarly, a user sequentially and interactively selects a material made into the constituent components of an electronic device package. The input screen image shown in FIG. 6 shows names of materials that are material data items fetched from the material property database 2 (for example, Al, $Al_2O_3$, ALC, ALLOY42, and ALN). The user refers to the material names that are the material data items and shown in the input screen image in FIG. 6, and interactively selects a material that is to be made into the constituent components of the electronic device package which is to be assessed (for example, ALLOY42). Thus, the user interactively selects a material name from the material property database 2. Moreover, the input screen image shown in FIG. 6 presents the material properties of the user-selected material, including the modulus of elasticity (Young's modulus), Poisson ratio, and coefficient of linear expansion, which are fetched from the material property database 2.

Figure 7:
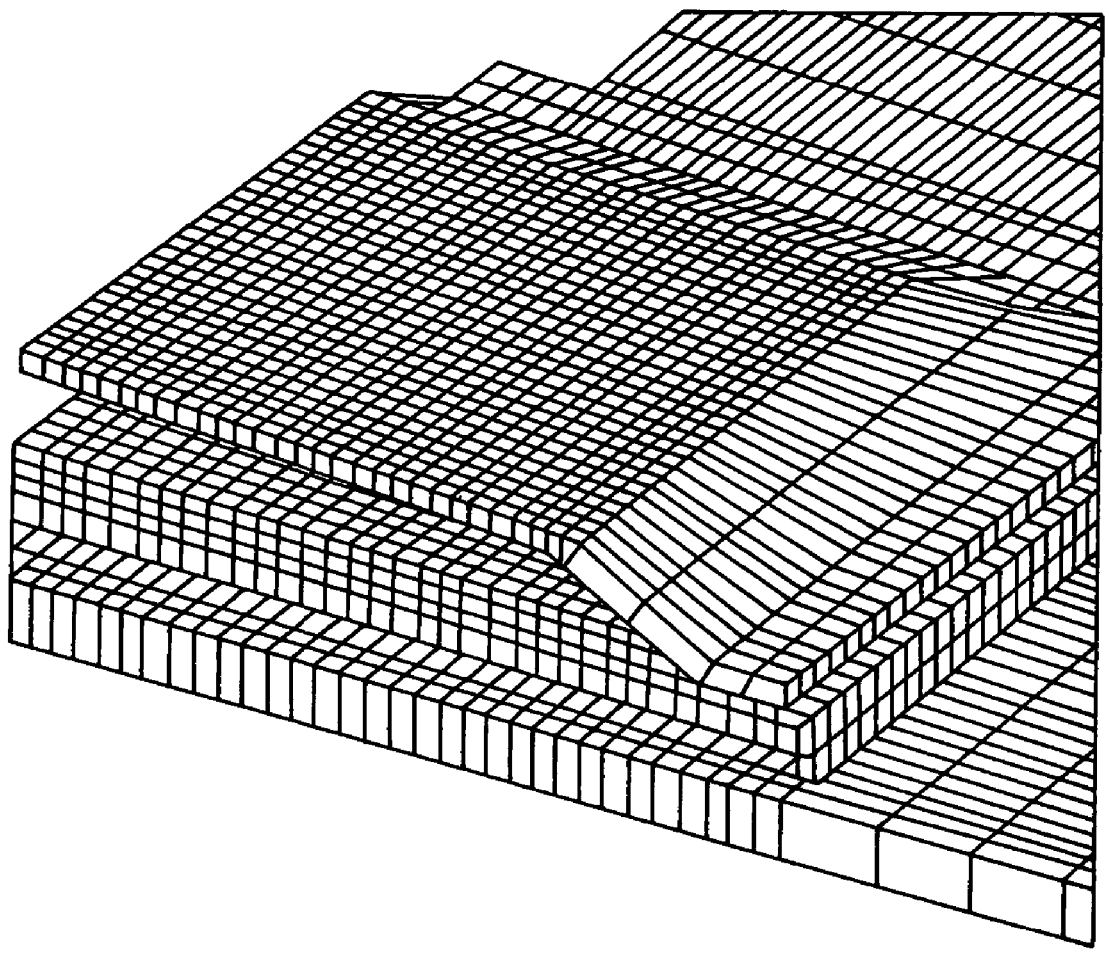
FIG. 7 is a conceptual diagram showing an example in which a simulation model according to the finite element method is automatically created.

Referring now back to FIG. 1, the modeling unit 4 creates a simulation model (B) on the basis of the user-designated data items (for example, the parameters representing the dimensions of an electronic device package and the material properties which are designated by the user). The modeling unit 4 is implemented by making the predetermined program residing in the computer system run. Furthermore, a simulation executing unit 5 uses the simulation model (B) created by the modeling unit 4 to carry out a simulation under the user-designated conditions. The simulation executing unit 5 is implemented by making the predetermined program residing in the computer system run. FIG. 7 shows an example of automatic production of a simulation model according to the finite element method.

FIG. 7 is a conceptual diagram showing an example in which a simulation model according to the finite element method is automatically created. A three-dimensional simulation model shown in FIG. 7 is automatically created by splitting a structure, which includes a solder joint of an electronic device package which is to be assessed, into a plurality of meshes by using the modeling means 4 (FIG. 1). The thus created simulation model is used to carry out the simulation by using a structural analysis simulator, for example, a solver using the finite element method.

Referring back to FIG. 1, an assessment criterion (condition for assessment), which is to be employed in assessing the results of simulation (C) carried out by the simulation executing unit 5, should preferably be predefined with reference to some past simulations. For example, with regard to the results of simulation obtained from a place in which the results of simulation vary remarkably due to concentration of stresses, such as a joint interface of a solder joint, the stresses applied to an area of 100 μm wide from the joint interface, i.e., the stresses obtained as the results of simulation (C), are averaged. Moreover, the results of past simulations are compared with the results of an experiment or measurement, in order to predefine the assessment criterion for assessing a destruction or a fatigue life. For example, a destructive stress acting on the joint interface between the pad portion and the solder portion is set to 100 MPa (megapascal). The assessment criterion is preserved in a database called an assessment criterion database 9.

In the apparatus for predicting reliability in the electronic device package shown in FIG. 1, the results-of-simulation assessing unit 6 assesses the results of executed simulation according to the above assessment criterion. The results-of-simulation assessment unit 6 is implemented by making the predetermined program residing in the computer system run. For example, when the results-of-simulation assessment unit 6 checks for destruction, it is determined whether or not an electronic device package is destroyed. In calculating the fatigue life of the electronic device package, the number of applied stress cycles corresponding to a fatigue life is determined and then displayed on the screen.

Figure 8:
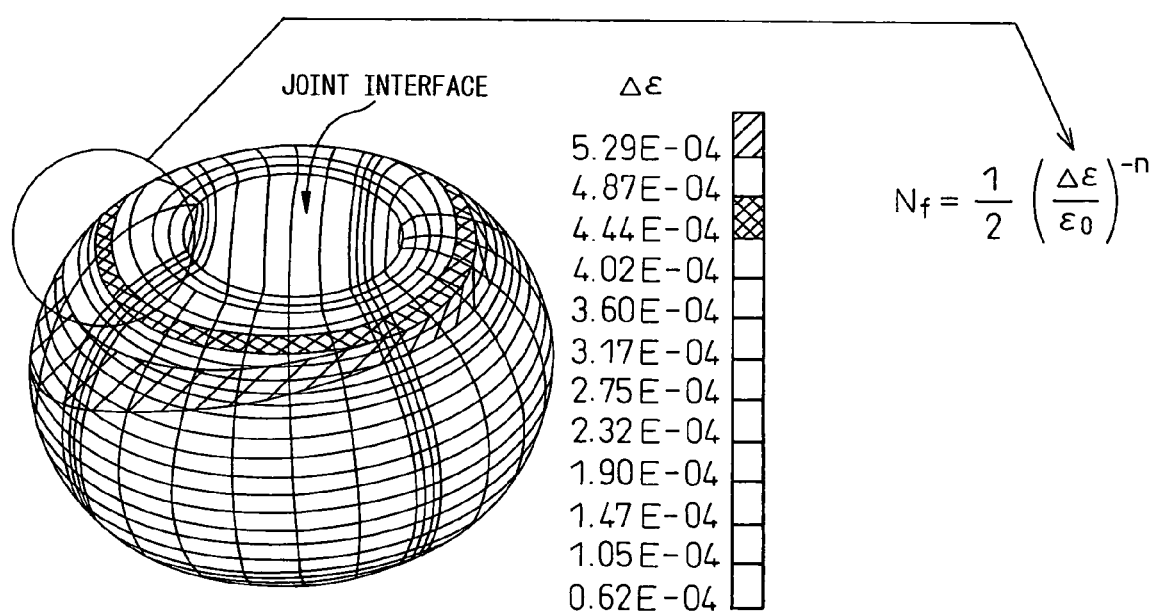
FIG. 8 is a schematic diagram showing an example of the calculation of a fatigue life represented by the number of stress cycles.

FIG. 8 is a schematic diagram showing an example of the calculation of a fatigue life represented by the number of stress cycles. In FIG. 8, an estimated fatigue life represented by an estimated number of stress cycles is calculated for each of the meshes into which a solder joint of an electronic device package is split in order to created a three-dimensional simulation model (shown in the left part of FIG. 8). More particularly, data representing a strain (for example, a strain amplitude $\Delta\epsilon$) is read out from the results of simulation (C) in relation to each mesh, and the number of stress cycles Nf corresponding to a fatigue life is calculated according to an expression of relation of $Nf=\frac{1}{2}(\Delta\epsilon/\epsilon_0)^{-n}$. The calculated fatigue lives are graphically expressed. Herein, $\epsilon_0$ denotes a coefficient determined by the material properties concerning the electronic device package, and n denotes a predefined index. Furthermore, the strain amplitude $\Delta\epsilon$ represents a change in a strain amplitude occurring during one of the stress cycles Nf (shown in the right part of FIG. 8). With regard to the distribution of strain values in the simulation model shown in FIG. 8, a portion around the places in which a maximum strain (or a maximum stress) is detected is indicated by hatching. As is apparent from the distribution of strain values in FIG. 8, the maximum strain occurs around the joint interface of a solder joint, and the number of stress cycles Nf corresponding to a fatigue life in the place (the hatched portion) is the smallest.

After the results of simulation carried out by using the simulation model are assessed according to the foregoing procedure, if the results of assessment obtained by carrying out the simulation causes a problem, the parameters which were inputted are modified. The procedure starting with automatic creation of a simulation model and ending with assessment of simulation is executed again and repeated until the necessary conditions are satisfied.

Referring back to FIG. 1, after the foregoing procedure is completed, when a user recognizes the completion of the assessment of simulation, the results-of-simulation assessment unit 6 registers, in a results-of-assessment database (D), the inputted parameters and data concerning the results of assessment obtained by assessing the stress, strain, and fatigue life represented by the number of stress cycles as the results of simulation.

When the number of combinations of the inputted parameters and the results of assessment obtained by carrying out a simulation which is concerned with the same type of electronic device package exceeds the number of the inputted parameters (the sum of the number of the inputted parameters representing dimensions, the number of material properties, and the number of conditions for a load), an assessment expression generating unit 7 shown in FIG. 1 produces an assessment expression (E) as an approximate expression that makes the inputted parameters approximate to the results of assessment. The assessment expression production unit 7 is implemented by making the predetermined program, residing in the computer system, run.

FIG. 9 illustratively shows an example of parameters which are to be inputted in order to generate an approximate assessment expression. Herein, for example, an assessment expression, which is to be used to assess a maximum stress (assessed stress) SA occurring in a sample of a bimetallic electronic device package having a two-layered structure as shown in FIG. 9, is taken as an example of the approximate assessment expression. In this case, the number of parameters is eight. Namely, these parameters include the length x of a member, the thicknesses y and z thereof, material properties thereof (Young's moduli EA and EB and coefficients of thermal expansion TA and TB), the difference of temperature $\Delta T$ (variation in temperature T=100° C.). For simplifying the explanation, it is assumed that only the dimensions x, y, and z of each member are regarded as parameters which are to be inputted, and the remaining parameters are set to fixed values.

At this time, the maximum stress SA is regarded as a function of the parameters which are to be inputted as follows:

$$SA = f(x,y,z,EA,EB,TA,TB,\Delta T) \quad (1)$$

As the range within which the value of each of the parameters can be inputted is restricted to some extent, the above expression (1) can be approximated by a quadratic polynomial expression or the like (orthogonal polynomial expression) as follows:

$$SA \cong a_0 + a_1 x + a_2 x^2 + b_1 y + b_2 y^2 + \ldots + d_1 \Delta T + d_2 (\Delta T)^2. \quad (2)$$

where $a_0$, $a_1$, $a_2$, $b_1$, $b_2$, etc., $d_1$, and $d_2$ denote unknown coefficients.

In the above expression (2), if the number of combinations of the inputted parameters and the results of assessment of the maximum stress SA, which is the same as the number of unknown coefficients, is obtained, the unknown coefficients can be uniquely determined. If the number of the above combinations exceeds the number of unknown coefficients, the unknown coefficients can be highly accurately predicted according to the least squares method or the like.

Referring back to FIG. 1, when a type of electronic device package in which an approximate assessment expression has already been established is designated by using parameters inputted by a user, an assessment estimating unit 8 uses the assessment expression (E) to estimate the results of assessment. The results of a prediction which is based on the assessment expression (E) is outputted from the assessment estimating unit 8 (results of prediction output (F) in FIG. 1). If an assessment expression has already been established based on a predetermined number of data items stored in the results-of-assessment database (D), a stress, a strain, a fatigue life represented by the number of stress cycles can be estimated with a certain accuracy. Consequently, the results of assessment with a certain accuracy can be obtained without the necessity of carrying out the simulation that requires a long calculation time. The assessment estimation unit 8 is implemented by making the predetermined program, residing in the computer system, run.

FIG. 10 is a graph indicating an example of results of assessment obtained by carrying out a fatigue test on a solder joint. FIG. 11 is a graph indicating the relationship between a fatigue life represented by the number of stress cycles and a strain amplitude.

In the graph shown in FIG. 10, each empty circle indicates the result of assessment, which is obtained by carrying out a mechanical fatigue test, in the form of the relationship between a fatigue life represented by the number of stress cycles Nf and a strain amplitude AE (a change in a strain amplitude occurring during one of stress cycles Nf). Each filled circle indicates the result of assessment, which is obtained by carrying out a thermal fatigue test, in the form of the relationship between the fatigue life represented by the number of stress cycles Nf and the strain amplitude Δε. Each empty diamond indicates the result of assessment, which is obtained by carrying out a three-point bending fatigue test (BGA assembly), in the form of the relationship between the fatigue life represented by the number of stress cycles Nf and the strain amplitude Δε. These results of assessment are stored and preserved in the results-of-assessment database (D). As long as a predetermined number of data items is preserved in the results-of-assessment database (D), an assessment expression plotted as an approximate straight line, such as the approximate straight line shown in FIG. 10, can be generated.

The graphs shown in FIG. 11 indicate the relationship between a fatigue life represented by the number of stress cycles (cycle) and a strain amplitude (absolute value). Each empty triangle indicates the strain amplitude (μm) calculated based on an analytic value obtained by assessing the results of simulation. On the other hand, each empty square indicates the strain amplitude (mm) calculated based on an assessment expression (approximate expression) plotted as an approximate straight line. As long as a predetermined number of results of assessment is preserved in the results-of-assessment database (D), both graphs will be nearly consistent with each other.

According to the embodiments related to the apparatus for predicting reliability in an electronic device package in accordance with the present invention, as the results of simulation are assessed, a certain stable assessment can be obtained. Moreover, a user need not have special knowledge of material properties or a simulation and can assess an electronic device package merely by using the knowledge on the structure of the electronic device package. With regard to an electronic device package in which an approximate assessment expression has already been established, a simulation need not be executed but an assessment with a certain accuracy can be obtained for a very short period of time.

The invention claimed is:

1. An apparatus for predicting reliability in an electronic device package, comprising:
  a package modeling database storing data concerning a shape of an electronic device package and specifications for modeling the electronic device package;
  a material property database storing data concerning material properties of the electronic device package;
  a parameter designating unit receiving parameters inputted to designate a type of the electronic device package, dimensions of the shape thereof, material thereof and properties of the material, and assessment conditions thereof;
  a modeling unit creating a simulation model of the package on the basis of the inputted parameters of the properties of the material, and the dimensions of the electronic device package, which are designated by using the inputted parameters;
  a simulation executing unit using the simulation model, which is created by the modeling unit, to execute a simulation under the conditions designated by the inputted parameters;
  a results-of-simulation assessing unit assessing the results of the simulation executed by the simulation executing unit on the basis of a predetermined assessment criterion, and storing and preserving, in a results-of-assessment database, the inputted parameters and results of assessment which are obtained by the assessing the results of the simulation, with regard to each type of electronic device package;
  an assessment expression generating unit generating, as an assessment expression, an approximate expression, which infers the results of assessment from the inputted parameters, on an assumption that a predetermined amount of the results of assessment is preserved in the results-of-assessment database; and
  an assessment predicting unit, when an electronic device package in which the assessment expression has already been established is designated by using the inputted parameters, outputting the results of an assessment prediction according to the assessment expression; wherein
  an orthogonal polynomial expression, based on a design of experiments method, is used to generate an initial assessment expression in establishing the assessment expression, and the assessment expression is updated on the basis of the least squares method;
  when a number of combinations of the inputted parameters and the results of assessment obtained by carrying out a simulation which is concerned with the same type of electronic device package exceeds a number of the inputted parameters, comprising a sum of the number of the inputted parameters representing dimensions, a number of material properties, and a number of conditions for a load, an assessment expression generating unit produces an assessment expression (E) as an approximate expression that makes the inputted parameters approximate the results of assessment, the assessment expression production unit being implemented by running a predetermined program, residing in the computer system, wherein maximum stress SA is approximated by a quadratic polynomial expression, or an orthogonal polynomial expression, as follows:

$$SA \cong a_0 + a_1 x + a_2 x^2 + b_1 y + b_2 y^2 + \ldots + d_1 \Delta T + d_2 (\Delta T)^2$$

wherein ΔT denotes difference in temperature, $a_0$, $a_1$, $a_2$, $b_1$, $b_2$, etc., $d_1$, and $d_2$ denote unknown coefficients, as to which, if a number of combinations of the inputted parameters and the results of assessment of the maximum stress SA, which is the same as the number of unknown coefficients, is obtained, the unknown coefficients are uniquely determinable and, if the number of the above combinations exceeds the number of unknown coefficients, the unknown coefficients are predictable according to the least squares method.

2. An apparatus as set forth in claim 1, wherein the assessment expression generating unit updates the assessment expression every time the results of a simulation are obtained by carrying out the simulation.

3. A computer readable storage medium for controlling a computer and comprising a program for predicting reliability in an electronic device package by allowing a computer, which includes a package modeling database that stores data concerning the shape of an electronic device package and the specifications for modeling of the electronic device package, and a material database that stores data concerning the properties of a material made into the electronic device package, to function as:
  a parameter designating unit receiving parameters inputted to designate a type of the electronic device package, dimensions thereof, selected material thereof and properties of the material, and conditions for assessment thereof;
  a modeling unit creating a simulation model on the basis of parameters of the properties of the material, and the dimensions of the electronic device package, which are designated by using the inputted parameters;

a simulation executing unit using the simulation model which is created by the modeling unit, to execute a simulation under the conditions designated by the inputted parameters;

a results-of-simulation assessing unit assessing the results of a simulation carried out by the simulation executing unit on the basis of a predetermined assessment criterion, and storing and preserving, in a results-of-assessment database, the inputted parameters and the results of assessment which are obtained by assessing the results of a simulation, with regard to each type of the electronic device package;

an assessment expression generating unit generating, as an assessment expression, an approximate expression, which infers the results of assessment from the inputted parameters, on the assumption that a predetermined amount of the results of assessment is preserved in the results-of-assessment database; and an assessment predicting unit, when an electronic device package in which the assessment expression has already been established is designated by using the inputted parameters, outputting the results of an assessment prediction according to the assessment expression; wherein an orthogonal polynomial expression, based on a design of experiments method, is used to generate an initial assessment expression in establishing the assessment expression, and the assessment expression is updated on the basis of the least squares method;

when a number of combinations of the inputted parameters and the results of assessment obtained by carrying out a simulation which is concerned with the same type of electronic device package exceeds a number of the inputted parameters, comprising a sum of the number of the inputted parameters representing dimensions, a number of material properties, and a number of conditions for a load, an assessment expression generating unit produces an assessment expression (E) as an approximate expression that makes the inputted parameters approximate the results of assessment, the assessment expression production unit being implemented by running a predetermined program, residing in the computer system, wherein maximum stress SA is approximated by a quadratic polynomial expression, or an orthogonal polynomial expression, as follows:

$$SA \cong a_0 + a_1 x + a_2 x^2 + b_1 y + b_2 y^2 + \ldots + d_1 \Delta T + d_2 (\Delta T)^2$$

wherein $\Delta T$ denotes difference in temperature, $a_0$, $a_1$, $a_2$, $b_1$, $b_2$, etc., $d_1$, and $d_2$ denote unknown coefficients, as to which, if a number of combinations of the inputted parameters and the results of assessment of the maximum stress SA, which is the same as the number of unknown coefficients, is obtained, the unknown coefficients are uniquely determinable and, if the number of the above combinations exceeds the number of unknown coefficients, the unknown coefficients are predictable according to the least squares method.

4. A computer readable storage medium as set forth in claim 3, wherein the assessment expression generating unit updates the assessment expression every time the results of a simulation are obtained by carrying out the simulation.

5. A method for predicting reliability in an electronic device package by using a computer, which includes a package modeling database that stores data concerning the shape of an electronic device package and the specifications for modeling of the electronic device package, and a material database that stores data concerning the properties of a material made into the electronic device package, comprising:

receiving parameters inputted to designate a type of the electronic device package, dimensions thereof, selected material and properties of the material thereof, and conditions for assessment thereof;

creating a simulation model on the selected basis of the inputted parameters of the properties of the material, and the dimensions of the electronic device package, which are designated by using the inputted parameters;

using the created simulation model, to execute a simulation under the conditions designated by the inputted parameters;

assessing the results of simulation carried out by executing the simulation on the basis of a predetermined assessment criterion, and storing and preserving, in a results-of-assessment database, the inputted parameters and results of assessment which are obtained by assessing the results of a simulation, with regard to each type of the electronic device package;

generating, as an assessment expression, an approximate expression, which infers the results of assessment from the inputted parameters, on the assumption that a predetermined amount of the results of assessment is preserved in the results-of-assessment database; and outputting the results of an assessment prediction according to the assessment expression, when an electronic device package in which the assessment expression has already been established is designated by using the inputted parameters; wherein an orthogonal polynomial expression, based on a design of experiments method, is used to generate an initial assessment expression in establishing the assessment expression, and the assessment expression is updated on the basis of the least squares method;

when a number of combinations of the inputted parameters and the results of assessment obtained by carrying out a simulation which is concerned with the same type of electronic device package exceeds a number of the inputted parameters, comprising a sum of the number of the inputted parameters representing dimensions, a number of material properties, and a number of conditions for a load, an assessment expression generating unit produces an assessment expression (E) as an approximate expression that makes the inputted parameters approximate the results of assessment, the assessment expression production unit being implemented by running a predetermined program, residing in the computer system, wherein maximum stress SA is approximated by a quadratic polynomial expression, or an orthogonal polynomial expression, as follows:

$$SA \cong a_0 + a_1 x + a_2 x^2 + b_1 y + b_2 y^2 + \ldots + d_1 \Delta T + d_2 (\Delta T)^2$$

wherein $\Delta T$ denotes difference in temperature, $a_0$, $a_1$, $a_2$, $b_1$, $b_2$, etc., $d_1$, and $d_2$ denote unknown coefficients, as to which, if a number of combinations of the inputted parameters and the results of assessment of the maximum stress SA, which is the same as the number of unknown coefficients, is obtained, the unknown coefficients are uniquely determinable and, if the number of the above combinations exceeds the number of unknown coefficients, the unknown coefficients are predictable according to the least squares method.

6. A method as set forth in claim 5, wherein said generating the appropriate expression updates the assessment expression every time the results of a simulation are obtained by carrying out the simulation.

* * * * *